(No Model.)
M. BRAZEAU.
VENDING WAGON.
No. 498,231.      Patented May 30, 1893.
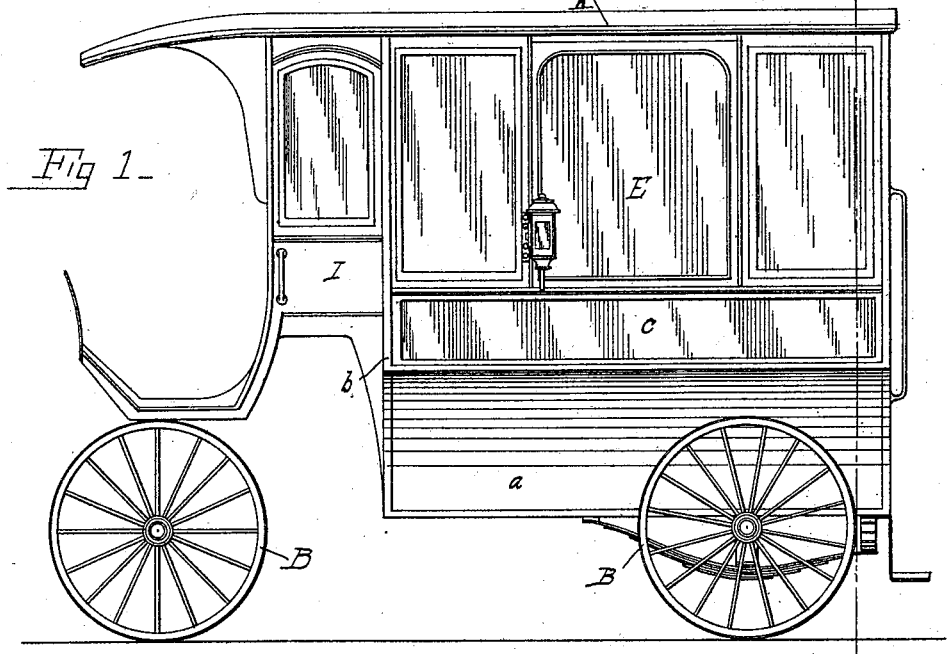
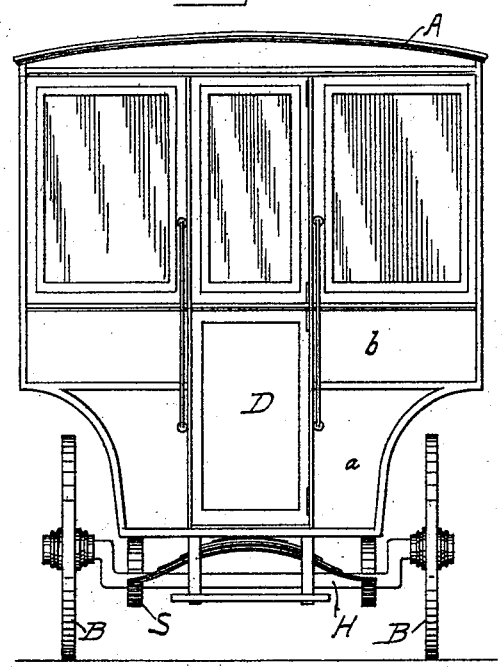 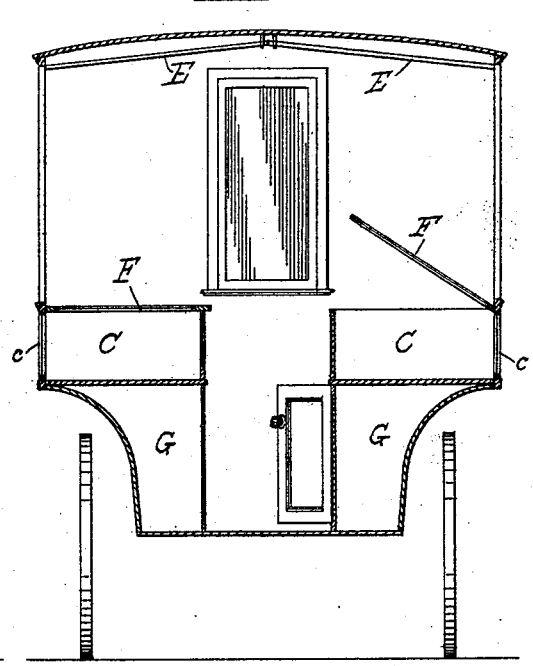
WITNESSES.
INVENTOR.

UNITED STATES PATENT OFFICE.

MELCHIOR BRAZEAU, OF CHICAGO, ILLINOIS.

VENDING-WAGON.

SPECIFICATION forming part of Letters Patent No. 498,231, dated May 30, 1893.

Application filed January 21, 1893. Serial No. 459,161. (No model.)

*To all whom it may concern:*

Be it known that I, MELCHIOR BRAZEAU, a citizen of Great Britain, residing at Chicago, county of Cook, and State of Illinois, have invented a new and useful Improvement in Wagons, of which the following is a specification.

The object of my invention is to provide a vending wagon, or a wagon in which articles may be carried about and exposed for sale, and is designed particularly for selling cigars on the street.

It consists of a wagon having a box set low between the wheels, narrow below and spreading out over the wheels above, with the sides above the wheels made of glass, forming a show-case, in which the goods are displayed, with a door in the rear, and a passage between the cases for the seller to stand in, and windows above the cases through which the sales are made.

It further consists of details hereinafter more fully described and particularly pointed out in the claims.

Figure 1 is a side elevation of my wagon. Fig. 2 is an end view of the same. Fig. 3 is a sectional view of the box on line $x$—$x$ Fig. 1.

A represents the box of the wagon; B, B, the running gear; C, C the show-cases; D the door; E, E the windows above the show-cases; F, F the hinged tops of the show-cases; G, G the storage cases; H the rear axle and I the driver's box, and S the springs.

The running gear of my wagon is of ordinary form, except that the rear axle is bent and the springs hung below it in order to bring the body as low as possible. The lower portion $a$ of the body is narrow between the wheels to give them clearance, and is widened out above them at $b$ to bring the show-cases out where they will be readily accessible from the outside. The sides $c$, $c$, of the cases are of glass. The cases extend the entire length of the body on each side leaving a passageway between them opposite the door D. The tops of the cases are also made of glass, and are hinged so as to open up as shown in Fig. 3. The windows E, E are hinged so as to swing up as shown in Fig. 3. Below the show-cases are cases G, G, where goods may be stored. The driver's box I is of ordinary form.

What I claim, and desire to secure by Letters Patent, is—

1. The herein described wagon body consisting of the combination of the narrow lower portion $a$, the wide upper portion $b$, the show-cases C, C on each side, located in the wide portion and extending out over the wheels, and leaving a passage between them, the door D opposite said passage, the glass sides $c$, $c$ of the show cases and the windows E, E above said show cases, all substantially as shown and described.

2. In a wagon the combination of the running gear having the bent axle H, and the suspended springs S, the wagon body A having the narrow lower portion $a$ and wide upper portion $b$, the show-cases C, C, on each side in the wide portion extending out over the wheels, and leaving a passage between them, the door D opposite said passage, the glass sides $c$, $c$ of said show-cases, and the windows E, E above said show-cases, all substantially as shown and described.

MELCHIOR BRAZEAU.

Witnesses:
F. J. LE MOYNE,
LOUIS V. LE MOYNE.